US009323013B2

(12) United States Patent
Shao et al.

(10) Patent No.: US 9,323,013 B2
(45) Date of Patent: Apr. 26, 2016

(54) BIDIRECTIONAL OPTICAL COMMUNICATIONS MODULE HAVING AN OPTICS SYSTEM THAT REDUCES OPTICAL LOSSES AND INCREASES TOLERANCE TO OPTICAL MISALIGNMENT

(71) Applicant: Avago Technologies General IP (Singapore) Pte. Ltd., Singapore (SG)

(72) Inventors: Bing Shao, Sunnyvale, CA (US); Ye Chen, San Jose, CA (US); Seng-Kum Chan, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/851,013

(22) Filed: Sep. 11, 2015

(65) Prior Publication Data
US 2016/0004020 A1    Jan. 7, 2016

Related U.S. Application Data

(63) Continuation-in-part of application No. 13/866,765, filed on Apr. 19, 2013.

(51) Int. Cl.
*G02B 6/36*        (2006.01)
*G02B 6/42*        (2006.01)
(Continued)

(52) U.S. Cl.
CPC ............... *G02B 6/4246* (2013.01); *G02B 3/04* (2013.01); *G02B 6/32* (2013.01); *G02B 6/4206* (2013.01);
(Continued)

(58) Field of Classification Search
CPC ........................................................ G02B 3/04
USPC ............................................................ 385/93
See application file for complete search history.

(56) References Cited

U.S. PATENT DOCUMENTS 6,198,864 B1    3/2001  Lemoff et al.
6,441,934 B1    8/2002  Boord et al.
(Continued)

FOREIGN PATENT DOCUMENTS

JP        2002-534709 A    10/2002

OTHER PUBLICATIONS

Jamshid Sangirov; Gwan-Chong Joo; Jae-Shik Choi; Do-Hoon Kim; Byueng-Su Yoo; Ikechi Augustine Ukaegbu; Nguyen T.H. Nga; Jong-Hun Kim; Tae-Woo Lee; Mu Hee Cho and Hyo-Hoon Park, 40 Gb/s optical subassembly module for a multi-channel bidirectional optical link, Optics Express, Jan. 27, 2014, pp. 1768-1783, vol. 22, Issue 2. OSA Publishing.
(Continued)

*Primary Examiner* — Sung Pak

(57) ABSTRACT

In a bidirectional optical communications module, an optics system is provided having a lens block that uses a single surface for reflecting light into or reflecting light passing out of the end of the optical fiber and a single surface for reflecting light toward a monitor photodetector. No other surfaces in the lens block are used to turn the light path. A filter block of the optics system that is adjacent to the lens block performs wavelength multiplexing and demultiplexing. The filter block reflects light at either its lower or upper surface back toward the lens block. In some embodiments, a portion of light passes through the upper surface of the filter block to provide some attenuation of light being transmitted so that the light is not coupled back into the light source. Because the upper surface of the filter block is the topmost surface of the optics system, the optics system can be very compact while also limiting the number of surfaces that turn the light path. Limiting the number of surfaces in the optics system that turn the light path reduces optical losses and increases tolerance to optical misalignment.

28 Claims, 8 Drawing Sheets

(51) Int. Cl.
  *G02B 6/32*      (2006.01)
  *G02B 3/04*      (2006.01)
  *G02B 17/00*     (2006.01)
  *H04B 10/40*     (2013.01)

(52) U.S. Cl.
  CPC .............. *G02B 6/426* (2013.01); *G02B 6/4215* (2013.01); *G02B 6/4286* (2013.01); *G02B 17/006* (2013.01); *H04B 10/40* (2013.01)

(56) References Cited

U.S. PATENT DOCUMENTS

| | | | |
|---|---|---|---|
| 6,574,398 B2 | 6/2003 | Coldren et al. | |
| 6,888,988 B2* | 5/2005 | Vancoille | G02B 6/4246 385/3 |
| 6,941,047 B2 | 9/2005 | Capewell et al. | |
| 6,959,133 B2* | 10/2005 | Vancoill | G02B 6/4204 385/140 |
| 8,032,032 B2 | 10/2011 | Chand et al. | |
| 8,503,838 B2* | 8/2013 | Chen | H04B 10/564 385/31 |
| 8,676,006 B2* | 3/2014 | Morioka | G02B 6/4214 385/14 |
| 8,724,944 B2 | 5/2014 | Kuznia et al. | |
| 8,923,671 B2* | 12/2014 | Hung | G02B 6/32 359/834 |
| 8,985,865 B2* | 3/2015 | Howard | G02B 6/3829 385/79 |
| 9,116,312 B2* | 8/2015 | Lin | G02B 6/4204 |
| 2003/0152336 A1 | 8/2003 | Gurevich et al. | |
| 2005/0089268 A1 | 4/2005 | Chen et al. | |
| 2009/0028579 A1 | 1/2009 | Deng | |
| 2010/0278482 A1 | 11/2010 | Adachi et al. | |
| 2012/0002284 A1* | 1/2012 | McColloch | G02B 6/4206 359/558 |
| 2012/0063721 A1 | 3/2012 | Chen | |
| 2014/0226988 A1 | 8/2014 | Shao et al. | |
| 2014/0314422 A1 | 10/2014 | Shao et al. | |

OTHER PUBLICATIONS

Office Action mailed Nov. 27, 2015 in Chinese Patent Application No. 201410066567.9.
Machine translation of JP2002-534709A, published Oct. 15, 2002.

* cited by examiner

BIDIRECTIONAL OPTICAL COMMUNICATIONS MODULE HAVING AN OPTICS SYSTEM THAT REDUCES OPTICAL LOSSES AND INCREASES TOLERANCE TO OPTICAL MISALIGNMENT

CROSS-REFERENCE TO RELATED APPLICATIONS

This application is a continuation-in-part application of, and claims priority to, U.S. application Ser. No. 13/866,765, filed on Apr. 19, 2013, entitled "A BIDIRECTIONAL PARALLEL OPTICAL TRANSCEIVER MODULE AND A METHOD FOR BIDIRECTIONALLY COMMUNICATING OPTICAL SIGNALS OVER AN OPTICAL LINK," which is currently pending and which is incorporated by reference herein in its entirety.

TECHNICAL FIELD OF THE INVENTION

The invention relates to optical communications networks over which data is communicated in the form of optical signals transmitted and received over optical waveguides. More particularly, the invention relates to a bidirectional optical communication module having an optics system that reduces optical losses and sensitivity to optical misalignment.

BACKGROUND OF THE INVENTION

In optical communications networks, optical communications modules are used to transmit and/or receive optical signals over optical fibers. Optical receiver modules are optical communications modules that receive optical signals, but do not transmit optical signals. Optical transmitter modules are optical communications modules that transmit optical signals, but do not receive optical signals. Optical transceiver modules are optical communication modules that transmit and receive optical signals. An optical transmitter or transceiver module generates amplitude and/or phase and/or polarization modulated optical signals that represent data, which are then optically coupled, or imaged, onto an end of an optical fiber by an optics system of the module. The light source is typically a laser diode or light emitting diode (LED). The optics system typically includes one or more reflective elements, one or more refractive elements and/or one or more diffractive elements.

An optical receiver or transceiver module includes a photodetector (e.g., a photodiode) that detects an optical data signal transmitted over an optical fiber and converts the optical data signal into an electrical signal, which is then amplified and processed by electrical circuitry of the module to recover the data. An optics system of the module optically couples the optical data signals passing out of the end of the optical fiber onto the photodetector.

While various transceiver and optical fiber link designs enable the overall bandwidth, or data rate, of optical fiber links to be increased, there are limitations on the extent to which currently available technologies can be used to increase the bandwidth of an optical fiber link. It has been shown that receiver-based electronic dispersion compensation (EDC) techniques in combination with particular modulation formats can be used to increase the bandwidth of optical fiber links. It is also known that multiple optical links can be combined to achieve an optical link having a higher data rate than that of each of the individual optical links that form the combination. However, in order to construct such a link, multiple sets of parallel optics and a corresponding number of optical fibers are needed, which significantly adds to the costs associated with such links. Therefore, there is difficulty associated with scaling such links to achieve increasingly higher bandwidths.

Recently, attempts have been made to design bidirectional optical links. In bidirectional (BiDi) optical links, data is transmitted and received over the same optical fiber. Therefore, BiDi optical links are attractive in terms of potentially reducing the number of components (e.g., optical fibers) that are needed to form the link. For this same reason, bidirectional optical links are also attractive in terms of scalability. In addition, many data centers have existing fiber infrastructures that could potentially be used in BiDi links to increase bandwidth without having to add fibers. However, BiDi optical links also present challenges in terms of dealing with optical crosstalk, return loss and signal-to-noise ratio (SNR). For example, higher data rate BiDi optical communications modules (e.g., those operating at speeds greater than 14 Gigabits per second (Gbps)) require greater power margins than modules operating at lower data rates. Consequently, in such modules, it is important to reduce optical losses and sensitivity to optical misalignment. In general, known optics systems used in BiDi optical communications modules are highly sensitive to optical misalignment and result in optical losses that are too great. Accordingly, a need exists for a BiDi optical communications module having an optics system that reduces optical losses while improving tolerance to optical misalignment.

DETAILED DESCRIPTION OF AN ILLUSTRATIVE EMBODIMENT

Figure 1:
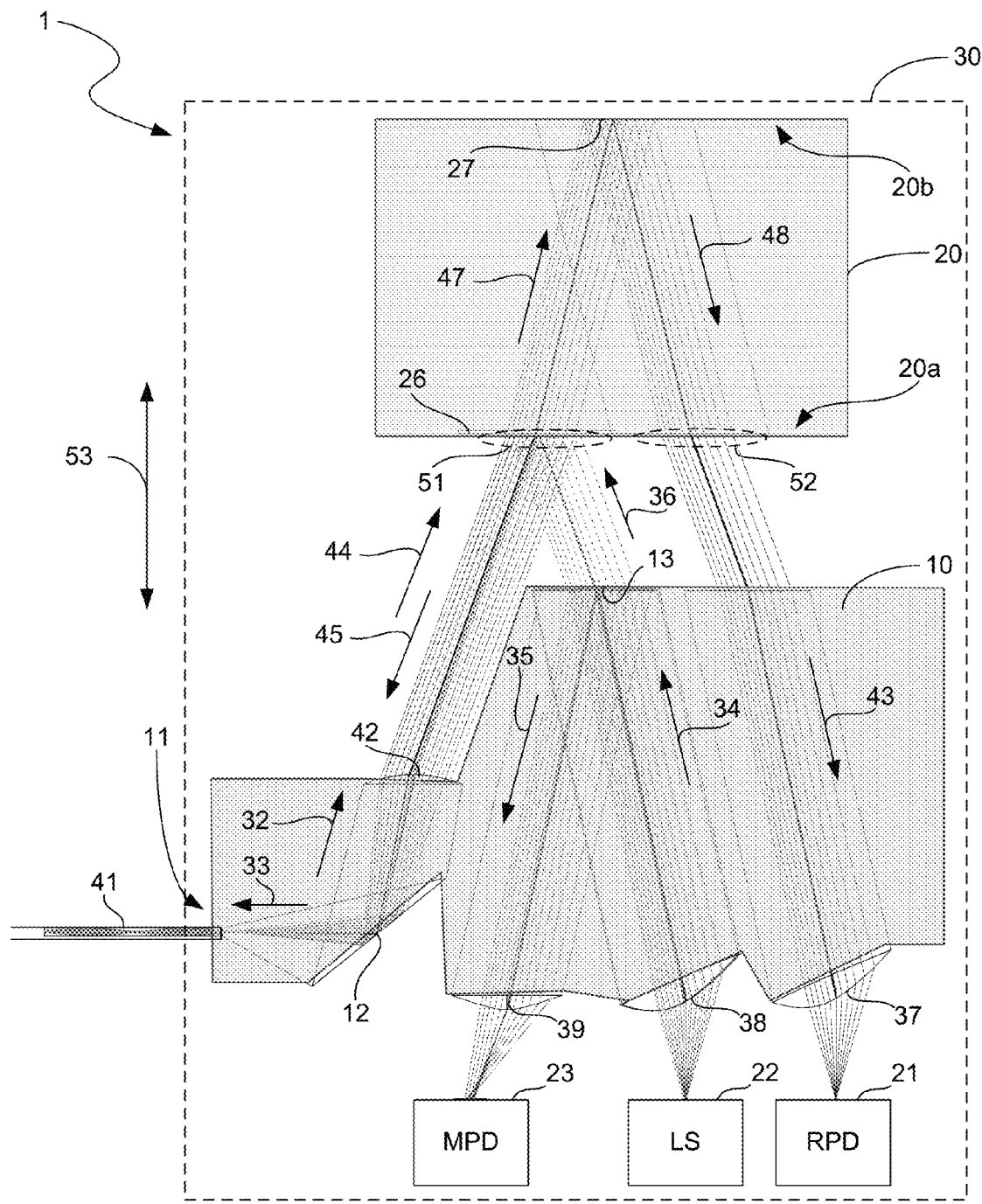
FIG. 1 illustrates a side plan view of an optics system of a BiDi optical communications module in accordance with an illustrative embodiment.

Illustrative embodiments of BiDi optical communications modules and of optics systems used therein are described herein. A lens block of the optics system uses a single surface for reflecting light into and for reflecting light passing out of the end of the optical fiber and a single surface for reflecting light toward a monitor photodetector. No other surfaces in the lens block are used to turn the light path. A filter block of the optics system that is adjacent to the lens block performs wavelength multiplexing and demultiplexing. The filter block reflects light at either its lower or upper surface back toward the lens block. In some embodiments, a portion of light passes through the upper surface of the filter block to provide some attenuation of light being transmitted so that the light is not coupled back into the light source. Because the upper surface of the filter block is the topmost surface of the optics system, the optics system can be very compact while also limiting the number of surfaces that turn the light path. Limiting the number of surfaces in the optics system that turn the light path reduces optical losses and increases tolerance to optical misalignment.

Various illustrative embodiments will now be described with reference to FIGS. 1-6, in which like reference numerals represent like features, elements or components. It should be noted that features, elements or components in figures are not necessarily drawn to scale, emphasis instead being placed on demonstrating principles and concepts of the invention.

FIG. 1 illustrates a side plan view of internal components of a bidirectional optical communications module 1 in accordance with an illustrative embodiment. For ease of illustration and for clarity, the housing and various other components of the module 1 are not shown in FIG. 1. The BiDi optical communications module 1 may have a single BiDi channel for simultaneously transmitting an optical signal and receiving an optical signal or it may have multiple BiDi channels for simultaneously transmitting multiple optical signals and receiving multiple optical signals. In the latter case, the module is referred to as a parallel BiDi optical communications module. In the side plan view shown in FIG. 1, the module 1 is shown as having only a single BiDi channel, although the module 1 may have N BiDi channels arranged side-by-side one another, where N is a positive integer that is greater than or equal to 2.

The module 1 includes a lens block 10, a filter block 20, at least one receive photodetector (RPD) 21, at least one light source (LS) 22 and at least one monitor photodetector (MPD) 23. In accordance with this illustrative embodiment, the receive and monitor photodetectors 21 and 23, respectively, are p-intrinsic-n (PIN) diodes, although other types of optical detectors may be used for this purpose. In accordance with this illustrative embodiment, the light source 22 is a vertical cavity surface emitting laser diode (VCSEL), although other types of light sources, including, for example, light-emitting diodes (LEDs) and other types of laser diodes, may be used for this purpose.

The lens block 10 and the filter block 20 comprise the optics system 30 of the module 1. The lens block 10 has an optical port 11 for attachment to an end of an optical fiber cable 41. The end of the optical fiber cable 41 is typically attached to the optical port 11 by a refractive index matching (RIM) epoxy, although the end of the optical fiber could have an optical connector (not shown) on it that is adapted to mate with the optical port 11. In the latter case, the optical port 11 is a receptacle shaped and sized to mate with the optical connector (e.g., a LC connector).

The optical port 11 has a first surface 12 that turns the optical pathway in the direction indicated by arrow 32 for received light passing out of the end of the optical fiber cable 41. In accordance with this illustrative embodiment, the first surface 12 is a total internal reflection (TIR) surface. For light to be transmitted, the first surface 12 turns the optical pathway in the direction indicated by arrow 33 to couple the light into the end of the optical fiber cable 41. As light produced by light source 22 propagates in the direction indicated by arrow 34, a second surface 13 of the lens block 10 turns the light path for a portion of the light in the direction indicated by arrow 35 for use by the monitor photodetector 23 in monitoring the power level of the light. The manner in which monitor photodetectors are used in optical communications modules for this purpose is well known and therefore will not be described in detail herein in the interest of brevity. In general, the output of the monitor photodetector is monitored to produce an electrical signal that is used by driver circuitry of the module to adjust the modulation and/or bias currents of the laser diode or LED.

The first and second surfaces 12 and 13 are the only two surfaces of the lens block 10 that are used to turn the light paths. Although light is slightly redirected at other surfaces of the lens block 10 due to refraction caused by refractive index changes as the light passes into or out of the lens block 10, these slight redirections are not considered as "turning" the light paths as that term is used herein. The term "turning," of a light path, as that term is used herein, is intended to denote a redirection of a light path caused by reflection. It should be noted that although the first and second surfaces 12 and 13 are described herein as reflective surfaces, these surfaces 12 and 13 are not limited to being reflective surfaces, but may be any surfaces that redirect light through optical operations other than refraction. For example, diffractive surfaces may be used to redirect light via diffraction.

The lens block 10 has first, second, third, and fourth aspherical lenses 37, 38, 39, and 42, respectively, formed therein for either focusing or collimating light. Lens 37 receives light traveling along an optical pathway in the direction indicated by arrow 43 and focuses the light onto the photosensitive area of the receive photodetector 21. Lens 22 receives light produced by light source 22, collimates the light into a collimated light beam and directs the collimated light beam in the direction indicated by arrow 34. Lens 39 receives the portion of light traveling in the direction indicated by arrow 35 after it has been turned by the second surface 13 and focuses the light portion onto the photosensitive area of the monitor photodetector 23. The second surface 13 is the interface between the air surrounding the lens block 10 and the material comprising the lens block 10. The change in the refractive index at this interface is sufficiently great that a portion of the light emitted by the light source 22 is reflected in the direction indicated by arrow 35 toward the monitor photodetector 23. The remaining portion of the light beam produced by the light source 22 propagates in the direction indicated by arrow 36 toward the filter block 20. The direction indicated by arrow 36 is slight different from the direction indicated by arrow 34 due to refraction at the second surface.

The lens 42 collimates the light beam turned by first surface 12 into a collimated beam traveling in the direction indicated by arrow 44. For collimated light traveling in the direction indicated by arrow 45, the lens 42 directs the light beam onto the first surface 12, which then converts the light beam into a converging light beam and directs the converging light beam onto the end of optical fiber cable 41. The end of the optical fiber cable 41 is located at the focal point of the lens 42 such that the converging light beam directed by lens 42 onto first surface 12 converges to a focal point on the end of the optical fiber cable 41.

The filter block 20 has a first filter element 26 disposed on a lower surface 20a thereof and a second filter element 27 disposed on an upper surface 20b thereof. The first filter element 26 is transmissive to a first wavelength of light and entirely or partially reflective to a second wavelength of light. The first wavelength is the operating wavelength of the receive photodetector 21. The second wavelength is the operating wavelength of the light source 22 and of the monitor photodetector 23. Therefore, the first filter element 26 is a beam splitter that passes light of the first wavelength propagating in the direction indicated by arrow 44 and that reflects some or all of the light of the second wavelength propagating in the direction indicated by arrow 36. The first filter element 26 may be partially transmissive to light of the second wavelength to allow some of this light to pass through it and be attenuated in order to reduce back reflection onto the light source 22. The second filter element 27 is a minor that is reflective to light of the first operating wavelength. Therefore, the second filter element 27 reflects light of the first wavelength that passes through the first filter element 26 propagating in the direction indicated by arrow 47. The light reflected by the second filter element 27 propagates in the direction indicated by arrow 48 toward the receive photodetector 21.

As indicated above, for ease of illustration and for clarity, the module housing and various other components of the module 1 are not shown in FIG. 1. For example, support structures for holding the lens block 10, the filter block 20 and the optoelectronic devices 21-23 are not shown in FIG. 1. The optoelectronic devices 21-23 and the lens block 10 are typically mounted on a printed circuit board (PCB) (not shown). The filter block 20 is typically mounted on two pedestals (not shown) that support the filter block 20 from opposite sides of the lower surface 20a of the filter block 20 without interfering with the light paths.

The two spots 51 and 52 on the lower surface 20a of the filter block 20 are spots at which the light paths intersect the filter block 20. These spots 51 and 52 remain a fixed distance away from one another even if there is some change in the position or orientation of the filter block 20 relative to the lens block 10. In other words, these spots 51 and 52 move in unison as the filter block 20 moves. This feature increases the tolerance of the optics system 30 to optical misalignment between the lens block 10 and the filter block 20. The increased tolerance to optical misalignment reduces optical losses, improves signal-to-noise ratio (SNR) and makes the alignment process easier to perform.

The relative positioning of the filter block 20 and the lens block 10 and the redirection of the light paths by the filter block 20 back toward the lens block 10 enable the optics system 30 to have a very low profile. In some optics systems used in known BiDi optical communications modules, the filter block is positioned in between the lens block and the optical port, and thus the optical pathways extend above and below the filter block. In such cases, it is more challenging to make such designs compact. In contrast, with the optics system 30 shown in FIG. 1, the optical pathways do not pass through the upper surface 20b of the filter block 20, and the optical port 11 is positioned below the filter block 20. This configuration allows the optics system 30 to be very compact in the directions indicated by double-headed arrow 53, which allows the module 1 to be very compact, or to have a very low profile. For example, the module 1 can be made to meet various Fiber Optic Connector Intermateability Standards (FOCIS) port height position requirements.

As indicated above, the only surfaces of the lens block 10 that are used to turn the light paths are the first and second surfaces 12 and 13, respectively. Limiting the number of surfaces in the lens block 10 that turn the light paths limits reflections, which helps keep optical losses low. In addition, limiting the number of surfaces in the lens block 10 that turn the light paths allows the light paths to be kept relatively short inside of the material of the lens block 10, which helps reduce optical losses that may be caused by the effect of material inhomogeneity or birefringence. The longer that an optical signal travels inside of a material, the more the signal becomes attenuated due to material absorption and the more the signal beam is distorted due to birefringence. Therefore, keeping the light paths short inside of the lens block 10 is important to reducing optical losses.

The lens block 10 is typically made of a plastic optical material, such as, for example, ULTEM® polyetherimide (PEI), which is a product offered by Saudi Basic Industries Corporation (SABIC) of Saudi Arabia. Other types of optical materials, such as other types of plastic and glass, for example, may be used for the lens block 10. Likewise, the filter block 20 may be made of, for example, glass or plastic optical materials such as ULTEM® PEI. The first and second filter elements 26 and 27 are typically made of multiple layers of dielectric and/or metallic material designed and manufactured to reflect or pass light of the desired wavelengths. In accordance with illustrative embodiments described herein, the optics system 10 is designed and manufactured so that the angles of incidence (AOIs) of the light beams on the first and second filter elements 26 and 27 are as close to 0° as possible and are typically less than or equal to about 20°. The small AOIs allow the first and second filter elements 26 and 27 to be polarization-independent, which allows the elements 26 and 27 to be designed and manufactured easily and at relatively low cost.

Figure 2:
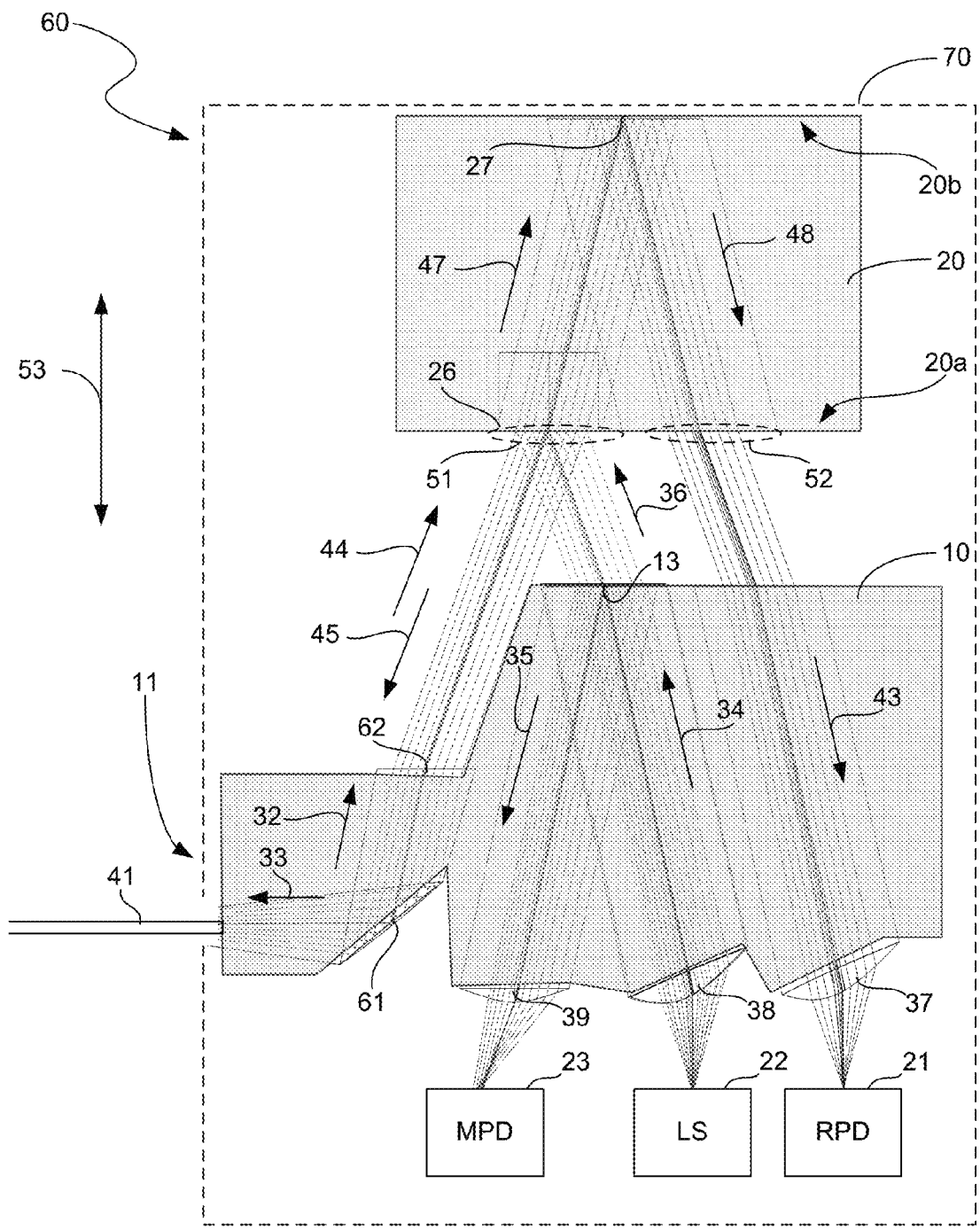
FIG. 2 illustrates a side plan view of an optics system of a BiDi optical communications module in accordance with another illustrative embodiment.

FIG. 2 illustrates a side plan view of internal components of a bidirectional optical communications module 60 in accordance with another illustrative embodiment. The module 60 shown in FIG. 2 has an optics system 70 that is identical to the optics system 30 of the module 1 shown in FIG. 1 with the exception that the TIR lens 12 and the aspherical lens 42 have been replaced by irregular lenses 61 and 62, respectively. The irregular lens 61 performs collimating operations on the received light beam and focusing operations on the light beam to be transmitted. The irregular lens 62 performs collimating operations on the received light beam and on the light beam to be transmitted. In all other respects, the optics system 70 operates in the same manner and has the same configuration as described above with reference to FIG. 1.

In the illustrative embodiments shown in FIGS. 1 and 2, the optoelectronic components 21-23 are mounted in a common plane that is parallel to the lower and upper surfaces 20a and 20b, respectively, of the filter block 20. This feature allows all of these components to be mounted on a common substrate (e.g., a PCB) on which other circuit components (not shown) of the modules 1 and 60 are mounted and to easily make electrical interconnects. Also, in accordance with this illustrative embodiment, the optoelectronic components 21-23 are positioned along a common line. This coplanar, in-line design and its benefits are described in parent U.S. application Ser. No. 13/866,765, which is incorporated herein by reference.

Figure 3:
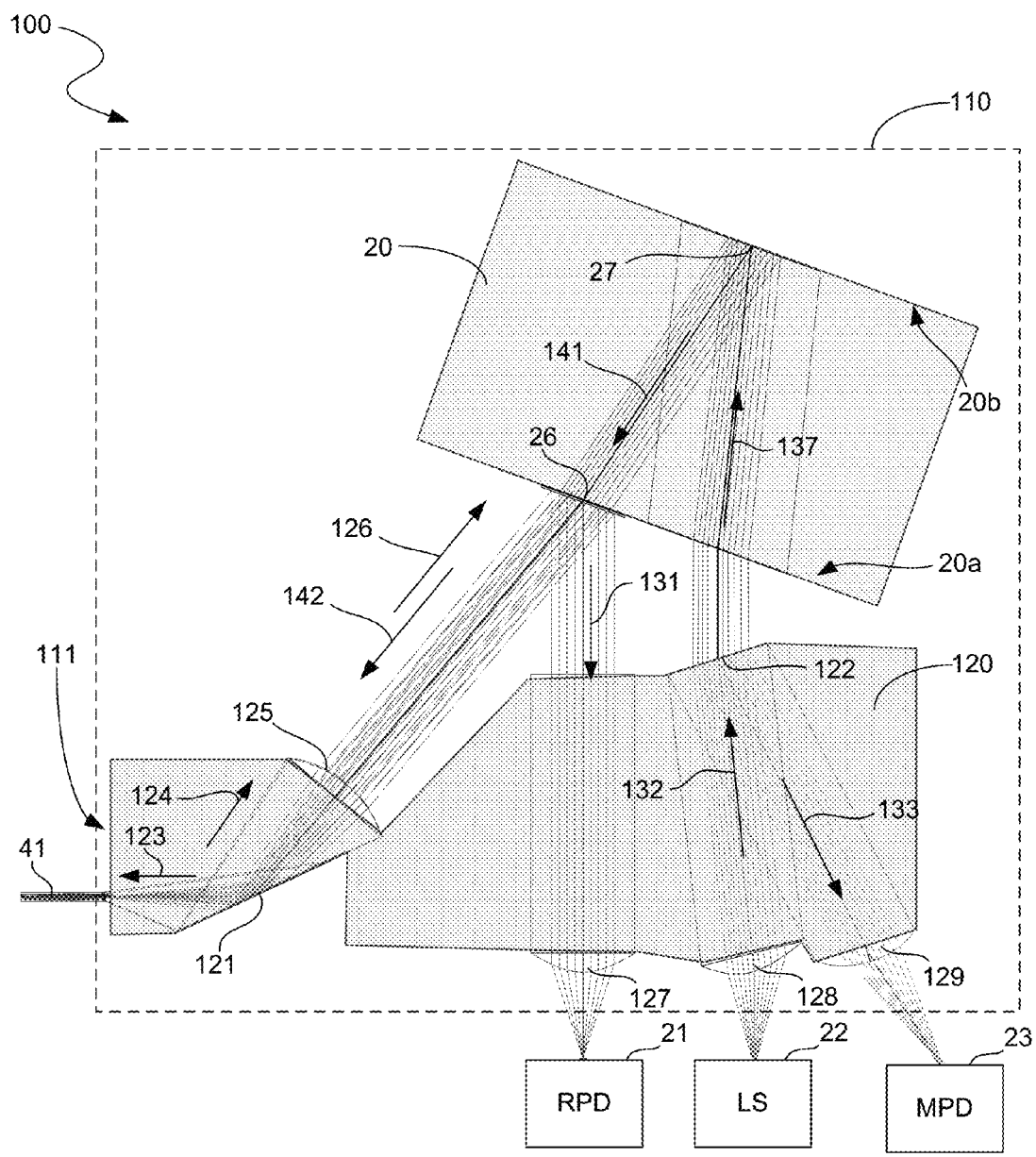
FIG. 3 illustrates a side plan view of an optics system of a BiDi optical communications module in accordance with another illustrative embodiment.

FIG. 3 illustrates a side plan view of internal components of a bidirectional optical communications module 100 in accordance with another illustrative embodiment. The module 100 has an optics system 110 that includes the filter block 20 shown in FIGS. 1 and 2 and a lens block 120. Unlike the filter block 20 shown in FIGS. 1 and 2, the filter block 20 shown in FIG. 3 is tilted such that the lower and upper surfaces 20a and 20b are not parallel to the surface (not shown) on which the optoelectronic components 21-23 are mounted. The optoelectronic components 21-23 are mounted on a common plane (e.g., a surface of a PCB) and the lower and upper surfaces 20a and 20b of the filter block 20 lie in respective planes that are parallel to one another, but at a non-zerodegree angle relative to the common plane on which the optoelectronic components 21-23 are mounted.

As with the lens block 10 shown in FIGS. 1 and 2, the lens block 120 shown in FIG. 3 uses only first and second surfaces 121 and 122, respectively, for turning the light paths. In the transmit direction, the first surface 121 turns the light beam in the direction indicated by arrow 123 and focuses the light beam into the end of the optical fiber cable 41 connected to the optical port 111 of the optics system 110. In the receive direction, the first surface 121 receives the light beam propagating out of the end of the optical fiber cable 41 and turns the light beam in the direction indicated by arrow 124 towards the filter block 20. An aspherical lens 125 then collimates the light beam and directs it in the direction indicated by arrow 126 toward the lens block 120.

In addition to the aspherical lens 125, the lens block 120 has three other aspherical lenses 127, 128 and 129. The received light beam propagating in the direction indicated by arrow 126 is reflected by the first filter element 26 disposed on the lower surface 20a of the filter block 20 in the direction indicated by arrow 131 toward the lens 127 of the lens block 120. The lens 127 receives the light beam propagating in the direction indicated by arrow 131 and focuses the light beam onto the photosensitive area of the receive photodetector 21. For the light beam produced by the light source 22, the lens 128 collimates the light beam, which propagates in the direction indicated by arrow 132. The second surface 122 of the lens block 120 reflects a portion of the light beam produced by light source 22 in the direction indicated by arrow 133 toward lens 129, which focuses the light beam onto the photosensitive area of the monitor photodetector 23. Like the second surface 13 shown in FIGS. 1 and 2, the reflection of the light beam toward the monitor photodetector 23 is caused by the refractive index change at the interface between the material comprising the lens block 120 and air.

A portion of the light beam propagating in the direction indicated by arrow 132 passes through the second surface 122 of the lens block 120, is slightly refracted, and propagates toward the filter block 20. This portion of the light beam, which is indicated by arrow 137 in the filter block 20, is incident on the second filter element 27 disposed on the upper surface 20b of the filter block 20. As indicated above, the first filter element 26 is transmissive to the first wavelength of light and reflective to the second wavelength of light. In accordance with this illustrative embodiment, the first wavelength is the operating wavelength of the light source 22 and the monitor photodetector 23 and the second wavelength is the operating wavelength of the receive photodetector 21. The second filter element 27 is a mirror that is entirely or partially reflective to light of the first operating wavelength. The second filter element 27 reflects at least a portion of the light beam of the first wavelength in the direction indicated by arrow 141 toward the first filter element 26. The second filter element 27 may be partially transmissive to light of the first operating wavelength to allow some of this light to pass through the second filter element 27 and be attenuated to prevent back reflection of the light onto the light source 22. The first filter element 26 is transmissive to the light beam of the first wavelength (arrow 141), and therefore this light beam passes through the first filter element 26, is slightly refracted, and propagates in the direction indicated by arrow 142 toward the lens 125. For the light beam of the second wavelength propagating in the direction indicated by arrow 126, the light beam is reflected by the first filter element 26 in the direction indicated by arrow 131. This light beam travels through the lens block 120 is focused by lens 127 onto the photosensitive area of the receive photodetector 21.

The optics system 110 has the same benefits as the optics systems 30 and 70 described above in terms of reduced optical losses and increased tolerance to misalignment due to short light pathways, few surfaces for turning light paths, small AOIs, and the relative positions and orientations of the lens block 120. The optics system 110 also has the same benefits as the optics systems 30 and 70 in terms compactness.

Figure 4A:
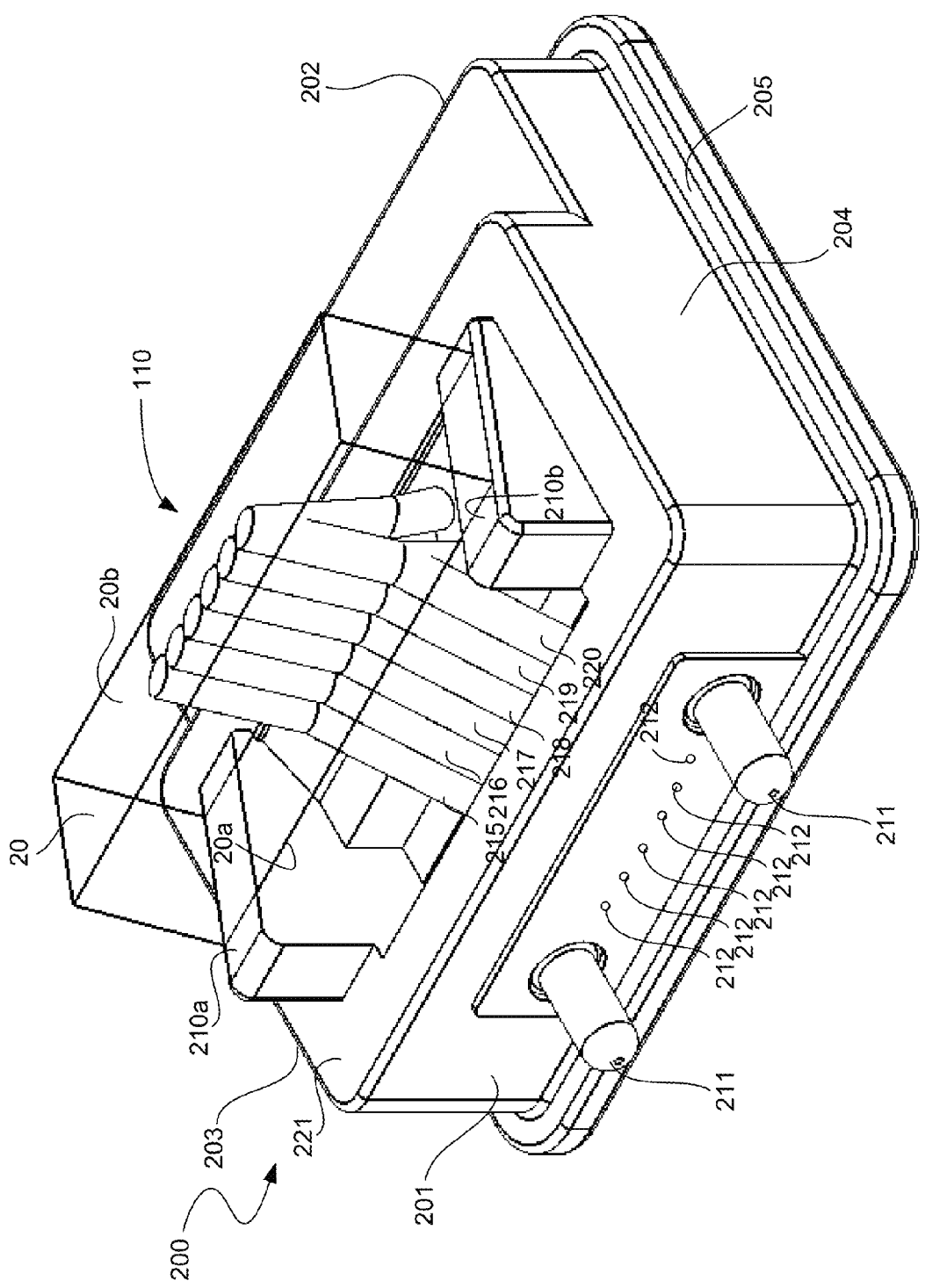
FIG. 4A illustrates a top perspective view of a housing of the optics system shown in FIG. 3 in accordance with an illustrative embodiment in which the optics system is used in a parallel BiDi optical communications module.
Figure 4B:
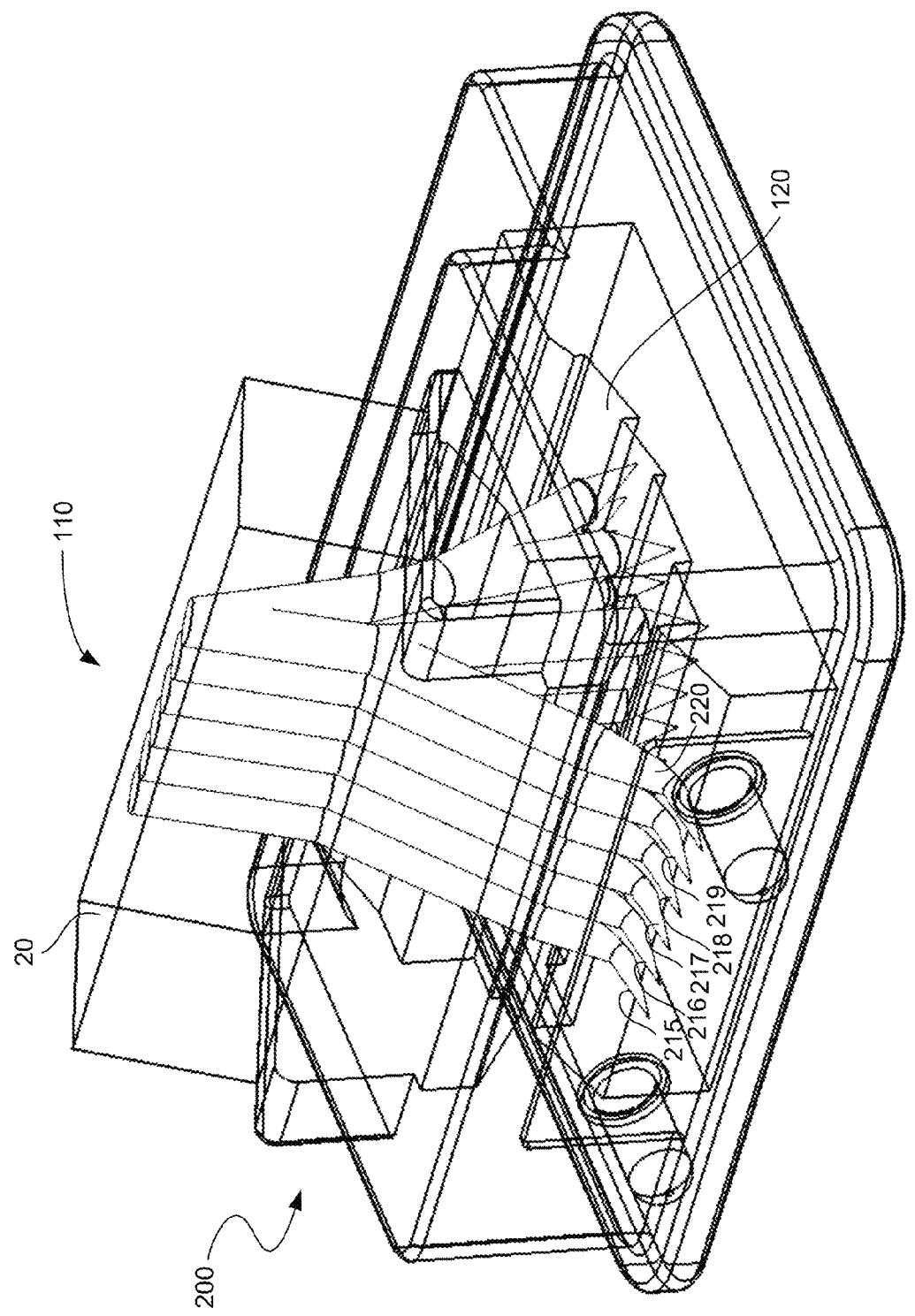
FIG. 4B illustrates a side perspective view of the housing of the optics system shown in FIG. 4A with outer surfaces of the housing made transparent to allow the light paths and features of the optics system to be seen.

As indicated above, the BiDi optical communications module may be a single-BiDi-channel optical communications module or a multi-BiDi-channel optical communications module, i.e., a parallel BiDi optical communications module. FIG. 4A illustrates a top perspective view of the optics system 110 shown in FIG. 3 disposed inside of a housing 200 that includes a support structure 210a and 210b for supporting the lens block 20. FIG. 4B illustrates a side perspective view of the housing 200 shown in FIG. 4A with the outer walls of the housing 200 made transparent to allow the light paths within the housing 200 to be seen. In accordance with this illustrative embodiment, the optics system 110 is configured, or adapted, for use with a parallel BiDi optical communications module having six BiDi channels for simultaneously transmitting six optical signals and receiving six optical signals. In accordance with this illustrative embodiment, the housing 200 is configured to mate with a multi-fiber ferrule (not shown) of a multi-fiber push-on/pull-off (MPO) connector that holds ends of six optical fiber cables (not shown).

The housing 200 is typically a plastic housing that is integrally formed with the lens block 120 of the optics system 110. For example, the housing 200 and the lens block 120 (FIG. 4B) may be formed as a single piece part of Ultem® PEI during an injection molding process. Of course, other materials and processes may be used to make the housing 200. Using injection molding as the process and plastic as the material ensures that the housing 200 is manufactured with high precision to meet very tight tolerances. This, in turn, helps ensure that the assembled optics system 110 meets alignment tolerances. In accordance with this illustrative embodiment, the housing 200 is designed and manufactured to meet FOCIS 5 standard, although the invention is not limited to this standard, as will be understood by persons of skill in the art in view of the description being provided herein.

With reference to FIG. 4A, the housing 200 has a generally rectangular cross section defined by front and rear sides 201 and 202, respectively, that are parallel to one another and by left and right sides 203 and 204, respectively, that are parallel to one another and perpendicular to the front and rear sides 201 and 202. The housing 200 has a flange 205 formed therein that functions as a base of the housing for facilitating mounting of the housing 200 on a planar surface, such as the surface of a PCB (not shown). The front side 201 has first and second generally cylindrically-shaped pins 211 extending therefrom for mating with respective openings formed in an MPO connector. The front side 201 has lenses 212 formed therein for coupling optical signals between the ends of the fibers held in the MPO connector and the lens block 120. The corresponding light paths are indicated by reference numerals 215-220. The bottom side of the housing 200 has an opening formed therein that is defined by the flange 205 such that when the housing 200 is mounted on a mounting surface, such as a PCB, the optoelectronic components 21-23 that are mounted on the same mounting surface are disposed within the opening.

The support structure 210 of the housing 200 comprises first and second pedestals 210a and 210b that extend from an upper surface 221 of the housing 200 at an acute angle to the upper surface 221 of the housing 200. The lower surface 20a of the filter block 20 sits on the pedestals 210a and 210b and is typically secured thereto by epoxy. It should be noted that no epoxy is disposed in any of the light paths, which also helps reduce optical losses. A dust cover (not shown) is typically secured to the housing 200 to help prevent dust and other contaminants from entering the housing 200 and interfering with the light paths.

Figure 5A:
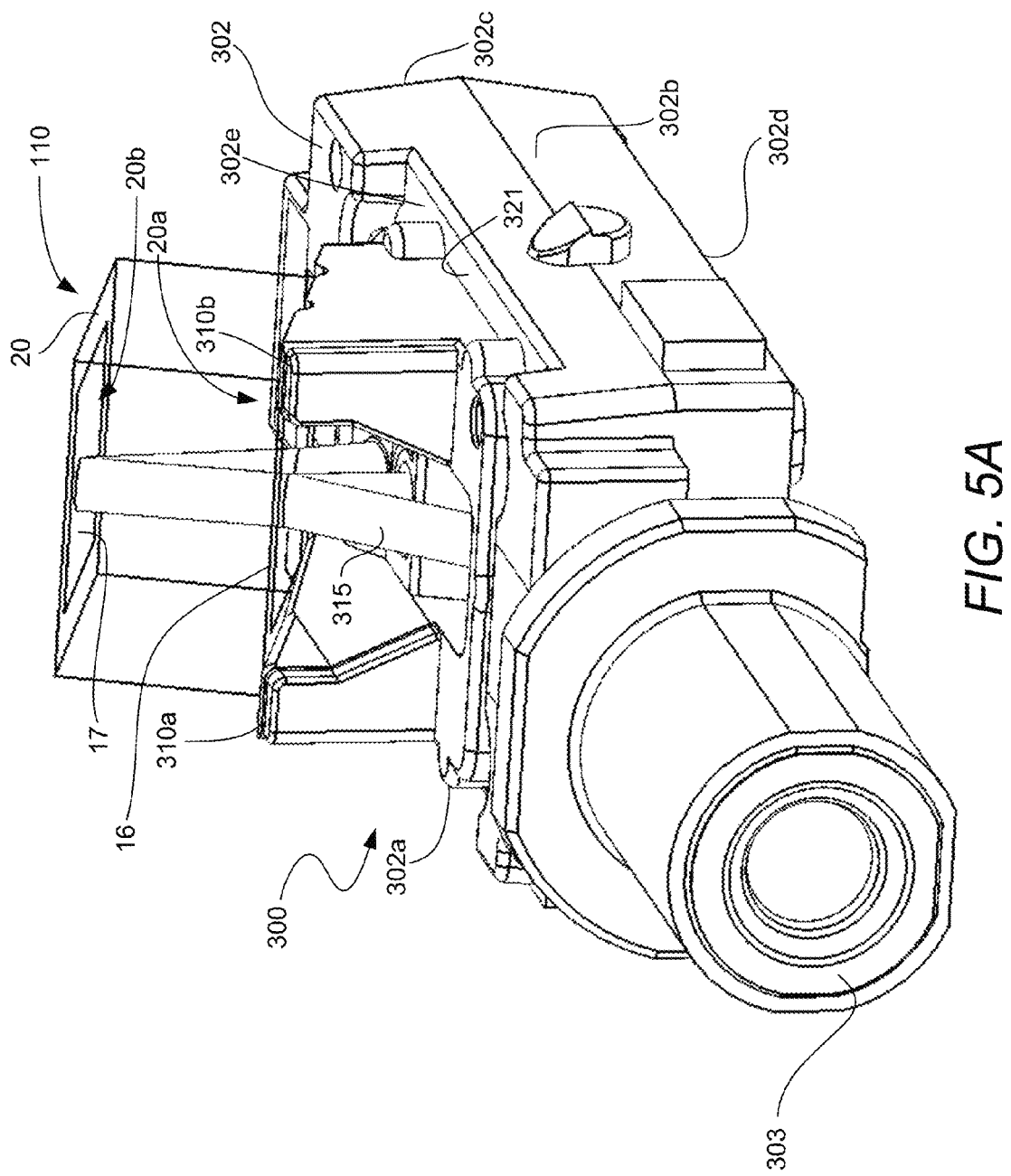
FIG. 5A illustrates a top perspective view of a housing of the optics system shown in FIG. 3 in accordance with an illustrative embodiment in which the optics system is used in a single-BiDi-channel optical communications module.
Figure 5B:
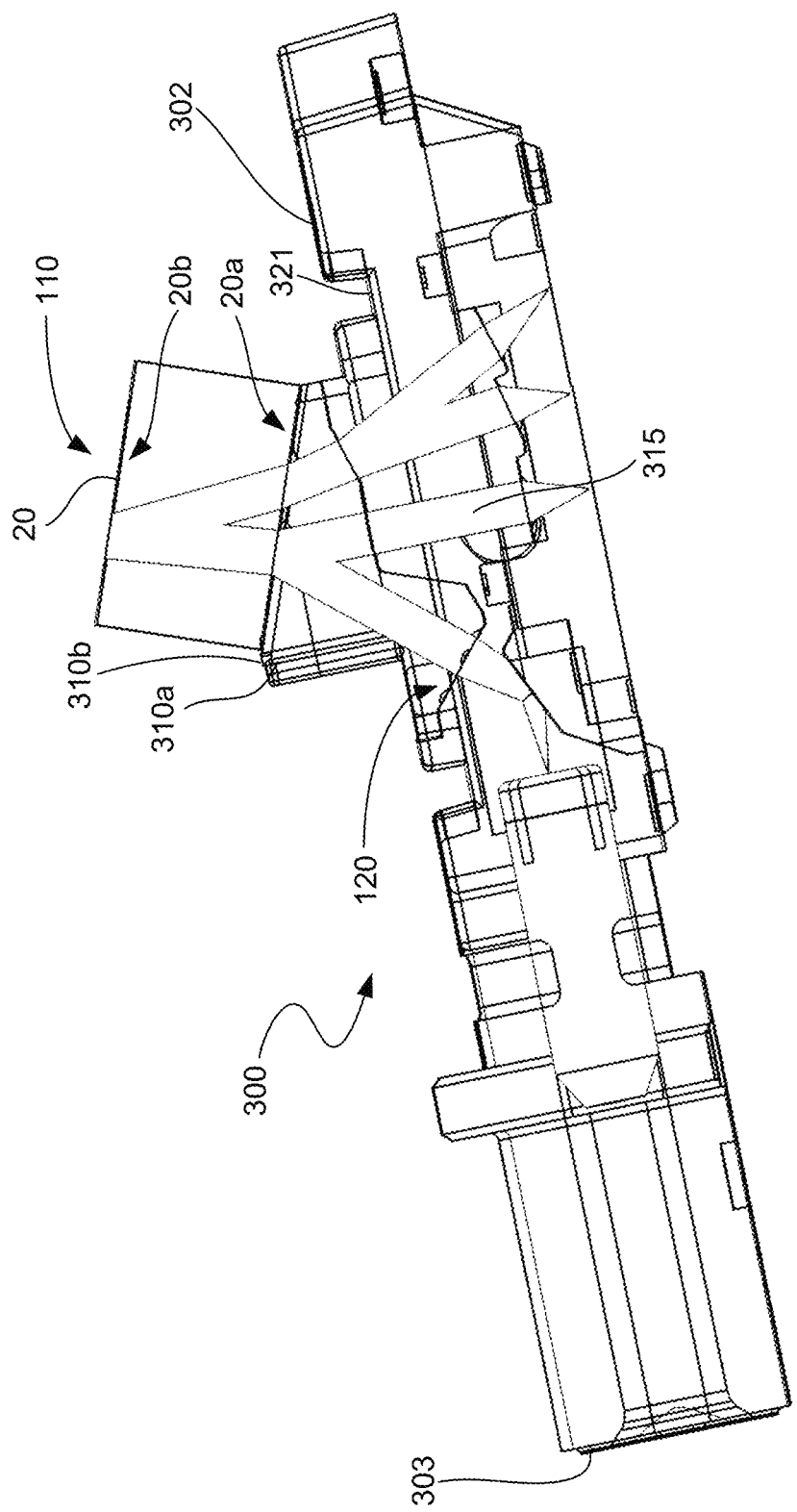
FIG. 5B illustrates a side perspective view of the housing of the optics system shown in FIG. 5A with outer surfaces of the housing made transparent to allow the light paths and features of the optics system to be seen.

FIG. 5A illustrates a top perspective view of the optics system 110 shown in FIG. 3 disposed inside of a housing 300 that includes a support structure 310a and 310b for supporting the lens block 20. FIG. 5B illustrates a side perspective view of the housing 300 shown in FIG. 5A with the outer walls of the housing 300 made transparent to allow the light path within the housing 300 to be seen. In accordance with this illustrative embodiment, the optics system 110 is configured, or adapted, for use with a single-BiDi-channel optical communications module, i.e., a module having single BiDi channel for simultaneously transmitting an optical signal and receiving an optical signal. In accordance with this illustrative embodiment, the housing 300 is configured to mate with an LC connector that holds the end of an optical fiber cable (not shown).

As with the housing 200, the housing 300 is typically a plastic housing that is integrally formed with the lens block 120 of the optics system 110. For example, the housing 300 and the lens block 120 (FIG. 5B) may be formed as a single piece part of Ultem® PEI during an injection molding process. In accordance with this illustrative embodiment, the housing 300 is designed and manufactured to meet FOCIS 10 standard.

With reference to FIG. 5A, the housing 300 has a body defined by a generally rectangular portion 302 having a generally cylindrical optical port 303 formed in a forward end thereof. The portion 302 has left and right sides 302a and 302b, respectively, a back side 302c, a bottom side 302d, and a top side 302e. The bottom side 302d has an opening formed therein such that when the housing 300 is mounted on a mounting surface, such as a PCB, the optoelectronic components 21-23 (not shown) that are mounted on the same mounting surface are disposed within the opening. The left and right sides 302a and 302b, respectively, are generally parallel to one another and the bottom and top sides 302d and 302e are generally parallel to one another and generally perpendicular to the left and right sides 302a and 302b.

The light paths, which can be seen best in FIG. 5B, are indicated by reference numeral 315. The support structure 310 of the housing 300 comprises first and second pedestals 310a and 310b that extend from an upper surface 321 on the top side 302e of the housing 300 at an acute angle to the upper surface 321 of the housing 300. The lower surface 20a of the filter block 20 is located on the pedestals 310a and 310b and is typically secured thereto by epoxy. The pedestals 310a and 310b do not interfere with the light paths 315. It should be noted that no epoxy is disposed in any of the light paths 315, which also helps reduce optical losses. A dust cover (not shown) is typically secured to the housing 300 to help prevent dust and other contaminants from entering the housing 200 and interfering with the light paths.

Figure 6:
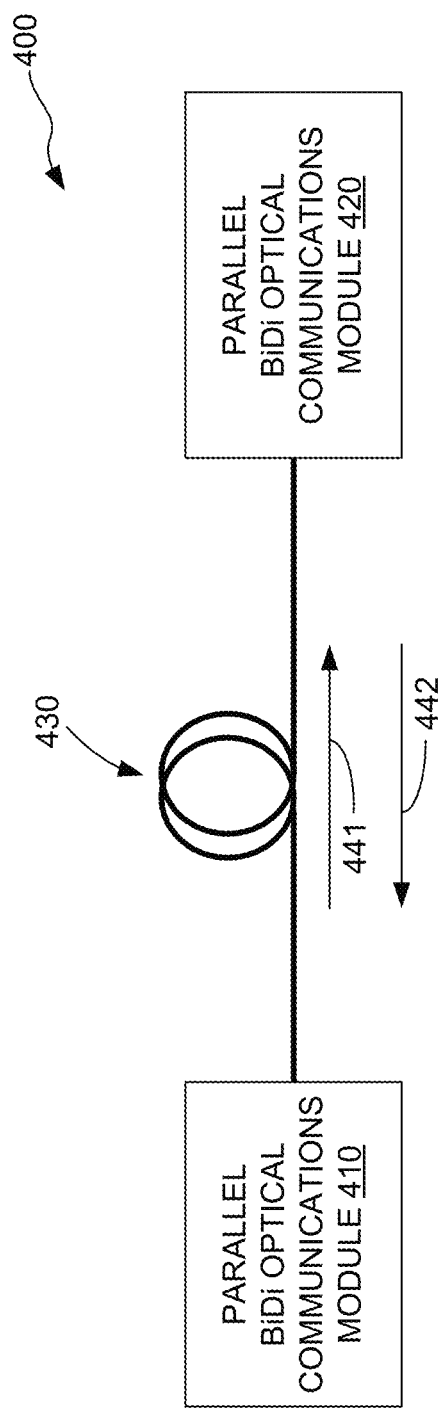
FIG. 6 illustrates a BiDi optical communications link that incorporates two parallel BiDi optical communications modules, each of which incorporates one of the optics systems shown in FIGS. 1-5B.

FIG. 6 illustrates a BiDi optical communications link 400 that incorporates two parallel BiDi optical communications modules 410 and 420 and an optical fiber cable 430 that interconnects the modules 410 and 420. The modules 410 and 420 may be any of the modules described above with reference to FIGS. 1-5B, or similar modules that incorporate the principles and concepts described above with reference to FIGS. 1-5B. The modules 410 and 420 may transmit and receive optical signals of the same wavelength, λ1, or they may transmit and receive optical signals of the first and second wavelengths, λ1 and λ2, respectively. The cable 430 may be, for example, an optical ribbon fiber cable having a number of fibers equal to the number of channels of the modules 410 and 420. For example, in a case where each of the modules 410 and 420 has six channels, the cable 430 would have six fibers. Optical signals are being transmitted and received over each fiber of the cable 430, so optical signals are being carried in both of the directions represented by arrows 441 and 442.

The BiDi optical communications link 400 is capable of having a very high bandwidth. For example, assuming that each of the modules 410 and 420 has six channels and that each channel simultaneously transmits at a data rate of 14 Gigabits per second (Gpbs) and receives at a data rate of 14 Gbps for an aggregate data rate of 28 Gbps per channel, then the BiDi data rate of the link 400 would be: 6×28 Gbps=168 Gbps. Of course, the data rate of the link 400 can be increased by using light sources and photodetectors that operate at higher rates and/or by increasing the number of channels that are provided in the modules and the number of fibers of the cable 430. In addition, other measures can be taken to further increase the link data rate, such as using electronic dispersion compensation techniques. Furthermore, because of the in-line configuration of the modules 410 and 420, the channel density of the modules 410 and 420 can be increased while maintaining their compact nature. Also, the compact nature of the modules 410 and 420 allows many of them to be placed side-by-side and/or stacked one on top of the other to allow a large number of the links 400 to be constructed using very little space.

It should be noted that the invention has been described above with reference to a few illustrative embodiments for the purposes of demonstrating the principles and concepts of the invention. The invention is not limited to the embodiments described herein, as will be understood by those of ordinary skill in the art in view of the description provided herein. Many modifications may be made to the embodiments described herein without deviating from the goals or objectives of the invention, and all such modifications are within the scope of the invention.

For example, additional filters may be used in the modules at various locations to further reduce crosstalk and return loss. As another example, beam splitters having shapes and orientations that are different from those shown may be used in the modules. Also, while the optical pathways within the modules have been shown in FIGS. 1-6 as having particular directionalities, the directionalities of these optical pathways may be different from that which is shown. Also, if it is unnecessary to monitor the optical signals that are produced by the light sources, the monitor photodetectors can be eliminated, in which case the second optical elements 13 and 122 would not be needed. Furthermore, the optics systems can have a variety of configurations that are different from the configurations of optics systems 30, 70 and 110, as will be understood by those of skill in the art, in view of the description provided herein. These and other modifications are within the scope of the invention, as will be understood by those of skill in the art, in view of the description being provided herein.

What is claimed is:

1. A bidirectional (BiDi) optical communications module for communication over a BiDi optical link, the module comprising:
   at least a first light source;
   at least a first photodetector;

a lens block, the lens block having an optical port for coupling light between at least a first end of a first optical fiber cable and a first surface of the lens block, wherein the first end of the first optical fiber cable is mechanically coupled with the port; and a filter block spaced apart from the lens block by a gap and optically aligned with the lens block, the filter block having a first filter element disposed on a lower surface thereof and a second filter element disposed on an upper surface thereof, the first filter element being transmissive to light of a first wavelength and reflective to light of a second wavelength, the second filter element being at least partially reflective to light of the second wavelength, wherein a first light beam passing out of the end of the optical fiber is directed by the first surface of the lens block onto the filter block and is reflected by either the first filter element or the second filter element onto the lens block, the lens block coupling the first light beam onto the first photodetector, wherein at least a first portion of a second light beam produced by the first light source is directed by the lens block onto the filter block, is at least partially reflected by either the first filter element or the second filter element onto the lens block, and coupled by the first surface of the lens block into the first end of the first optical fiber cable.

2. The BiDi optical communications module of claim 1, wherein the first wavelength is an operating wavelength of the first photodetector such that the first light beam is of the first wavelength, and wherein the second wavelength is an operating wavelength of the first light source such that the second light beam is of the second wavelength, and wherein the first light beam passes through the first filter element and is reflected by the second filter element onto the lens block and wherein at least the first portion of the second light beam is reflected by the first filter element onto the lens block.

3. The BiDi optical communications module of claim 2, further comprising:
at least a second photodetector, and wherein the lens block includes a second surface that reflects a second portion of the second light beam toward the second photodetector, the lens block coupling the second portion of the second light beam onto the second photodetector, the second photodetector being used to monitor a power level of the second light beam produced by the first light source.

4. The BiDi optical communications module of claim 3, wherein the lens block further comprises:
first, second and third lenses formed in or secured to the lens block, the first lens coupling the first light beam reflected by the second filter element onto the first photodetector, the second lens coupling the second light beam produced by the first light source onto the second surface of the lens block, the third lens coupling the second portion of the second light beam onto the second photodetector.

5. The BiDi optical communications module of claim 4, wherein the lens block further comprises:
a fourth lens formed in or secured to the lens block, the fourth lens coupling the second light beam reflected by the first filter element onto the first surface of the lens block, the fourth lens coupling the first light beam reflected by the first surface of the lens block onto the filter block.

6. The BiDi optical communications module of claim 5, wherein the first, second and third lenses are aspherical lenses.

7. The BiDi optical communications module of claim 6, wherein the fourth lens is an aspherical lens.

8. The BiDi optical communications module of claim 6, wherein the fourth lens is an irregular lens.

9. The BiDi optical communications module of claim 3, wherein the first surface is a total internal reflection (TIR) lens.

10. The BiDi optical communications module of claim 3, wherein the first surface is an irregular lens.

11. The BiDi optical communications module of claim 3, wherein the second surface is partially reflective and partially transmissive to the second light beam due to a refractive index change at an interface of the lens block and the gap, and wherein the partial reflectivity and partial transmissiveness of the second surface results in the second portion of the second light beam being reflected toward the second photodetector.

12. The BiDi optical communications module of claim 1, wherein the first light source and the first photodetector are mounted on a mounting surface in a common plane, and wherein the upper and lower surfaces of the filter block are parallel to one another and are parallel to the mounting surface.

13. The BiDi optical communications module of claim 1, wherein the first light source and the first photodetector are mounted on a mounting surface in a common plane, and wherein the upper and lower surfaces of the filter block are parallel to one another and at an acute angle to the mounting surface.

14. The BiDi optical communications module of claim 1, wherein the first wavelength is an operating wavelength of the first light source such that the second light beam is of the first wavelength, and wherein the second wavelength is an operating wavelength of the first photodetector such that the first light beam is of the second wavelength, and wherein the first light beam is reflected by the first filter element onto the lens block and wherein at least a portion of the second light beam is reflected by the second filter element, passes through the first filter element, is coupled by the lens block onto the first surface, and is reflected by the first surface into the end of the optical fiber cable.

15. The BiDi optical communications module of claim 14, wherein at least a portion of the second light beam passes through the second filter element.

16. The BiDi optical communications module of claim 14, further comprising:
at least a second photodetector, and wherein the lens block includes a second surface that reflects a second portion of the second light beam toward the second photodetector, the lens block coupling the second portion of the second light beam onto the second photodetector, the second photodetector being used to monitor a power level of the second light beam produced by the first light source.

17. The BiDi optical communications module of claim 16, wherein the lens block further comprises:
first, second and third lenses formed in or secured to the lens block, the first lens coupling the first light beam reflected by the first filter element onto the first photodetector, the second lens coupling the second light beam produced by the first light source onto the second surface of the lens block, the third lens coupling the second portion of the second light beam onto the second photodetector.

18. The BiDi optical communications module of claim 17, wherein the lens block further comprises:
a fourth lens formed in or secured to the lens block, the fourth lens coupling the second light beam reflected by the second filter element onto the first surface of the lens block, the fourth lens coupling the first light beam reflected by the first surface of the lens block onto the filter block.

19. The BiDi optical communications module of claim 18, wherein the first, second and third lenses are aspherical lenses.

20. The BiDi optical communications module of claim 19, wherein the fourth lens is an aspherical lens.

21. The BiDi optical communications module of claim 19, wherein the fourth lens is an irregular lens.

22. The BiDi optical communications module of claim 16, wherein the first surface is a total internal reflection (TIR) lens.

23. The BiDi optical communications module of claim 16, wherein the first surface is an irregular lens.

24. The BiDi optical communications module of claim 16, wherein the second surface is partially reflective and partially transmissive to the second light beam due to a refractive index change at an interface of the lens block and the gap, and wherein the partial reflectivity and partial transmissiveness of the second surface results in the second portion of the second light beam being reflected toward the second photodetector.

25. The BiDi optical communications module of claim 14, wherein the first light source and the first photodetector are mounted on a mounting surface in a common plane, and wherein the upper and lower surfaces of the filter block are parallel to one another and are parallel to the mounting surface.

26. The BiDi optical communications module of claim 14, wherein the first light source and the first photodetector are mounted on a mounting surface in a common plane, and wherein the upper and lower surfaces of the filter block are parallel to one another and at an acute angle to the mounting surface.

27. An optics system for use in a bidirectional (BiDi) optical communications module, the optics system comprising:
a lens block, the lens block having an optical port for coupling light between at least a first end of a first optical fiber cable and a first surface of the lens block when the first end of the first optical fiber cable is mechanically coupled with the port; and
a filter block spaced apart from the lens block by a gap and optically aligned with the lens block, the filter block having a first filter element disposed on a lower surface thereof and a second filter element disposed on an upper surface thereof, the first filter element being transmissive to light of a first wavelength and reflective to light of a second wavelength, the second filter element being reflective to light of the second wavelength, wherein a first light beam passing out of the end of the optical fiber is directed by the first surface of the lens block onto the filter block and is reflected by either the first filter element or the second filter element onto the lens block, the lens block coupling the first light beam onto the first photodetector, wherein at least a first portion of a second light beam produced by the first light source is directed by the lens block onto the filter block, is at least partially reflected by either the first filter element or the second filter element onto the lens block, and is coupled by the first surface of the lens block into the first end of the first optical fiber cable.

28. An optics system for use in a bidirectional (BiDi) optical communications module, the optics system comprising:
a lens block, the lens block having an optical port for coupling light beams between at least a first end of a first optical fiber cable and a first surface of the lens block when the first end of the first optical fiber cable is mechanically coupled with the port, the first surface reflecting a first light beam passing out of the first end of the first optical fiber cable in a first direction away from the first end of the first optical fiber, the first surface directing a first portion of a second light beam emitted by a first light source of the optical communications module into the first end of the first optical fiber cable, the lens block having a second surface for reflecting a second portion of a second light beam emitted by the first light source in a second direction that is different from the first direction and passing the first portion of the second light beam emitted by the first light source, the first and second light beams having first and second wavelengths, respectively; and
a filter block optically aligned with the lens block, the filter block receiving the first light beam reflected by the first surface and receiving the first portion of the second light beam that passes through the second surface and performing wavelength division multiplexing and demultiplexing operations on the first light beam and on the first portion of the second light beam, the filter block directing some or all of the first portion of the second light beam onto the first surface of the lens block and directing the first light beam reflected by the first surface of the lens block back toward the lens block.

* * * * *